United States Patent [19]

Beer et al.

[11] 4,207,643
[45] Jun. 17, 1980

[54] DRY WIPING SYSTEM FOR VEHICLES

[75] Inventors: Carl C. Beer, Philadelphia; Ronald E. Steffey, Cochranton, both of Pa.

[73] Assignee: Sherman Industries, Inc., Palmyra, N.J.

[21] Appl. No.: 16,184

[22] Filed: Feb. 28, 1979

[51] Int. Cl.² .............................................. B60S 3/06
[52] U.S. Cl. ................................ 15/97 B; 15/DIG. 2
[58] Field of Search ................ 15/97 B, DIG. 2, 3.13, 15/97 R

[56] References Cited

U.S. PATENT DOCUMENTS

| | | | |
|---|---|---|---|
| 1,118,547 | 11/1914 | Griffin | 15/97 R |
| 1,636,082 | 7/1927 | Stevens et al. | 15/97 R |
| 1,908,788 | 5/1933 | Pulliam | 15/97 R |
| 1,928,993 | 10/1933 | Cutler | 15/97 R |
| 3,504,394 | 4/1970 | Weigele et al. | 15/97 B |
| 4,087,877 | 5/1978 | Barber | 15/97 B |

Primary Examiner—Edward L. Roberts
Attorney, Agent, or Firm—Sidney A. Ochs

[57] ABSTRACT

An endless conveyor type chamois-like curtain drier for vehicles wherein a plurality of spaced drying curtains hang down into the frontal path of a vehicle and are pulled over the vehicle surfaces by the lower run of the conveyor to wipe the moisture therefrom. The curtains are returned in overlapping relationship by the upper run to the point of beginning after removing moisture therefrom by wringer roll or vacuum. An accelerator means in the form of a rotatable paddle wheel intercepts each of the curtains adjacent the head end of the conveyor to speed up the linear movement of the curtains and lift the individual curtains free of their laminated relationship and over and around the conveyor end returning the curtains to the beginning of the lower run in a freely hangable condition. The drier conveyor preferably includes a lateral run connecting the upper and lower runs of the conveyor which lateral run slopes obliquely inwardly and downwardly at an acute angle relative to the vertical and in the direction of movement of the lower run and away from the head end of the conveyor providing a vertical space in which the curtains may obtain their full free-hanging vertical position before entering the lower run. A side by side arrangement of two similar units with conveyors moving the lower runs in opposite directions provides a novel cross vehicle drying operation.

13 Claims, 6 Drawing Figures

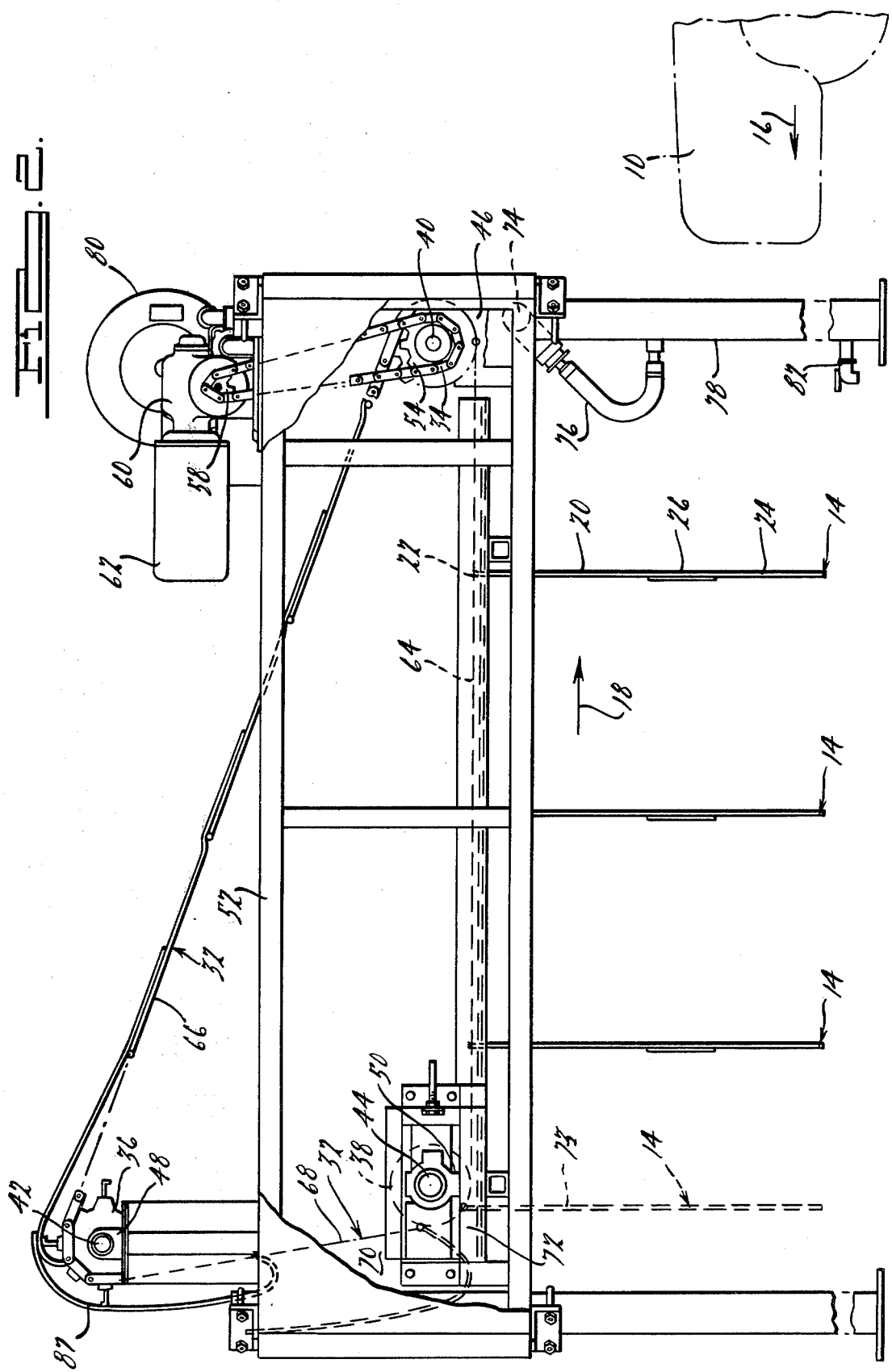

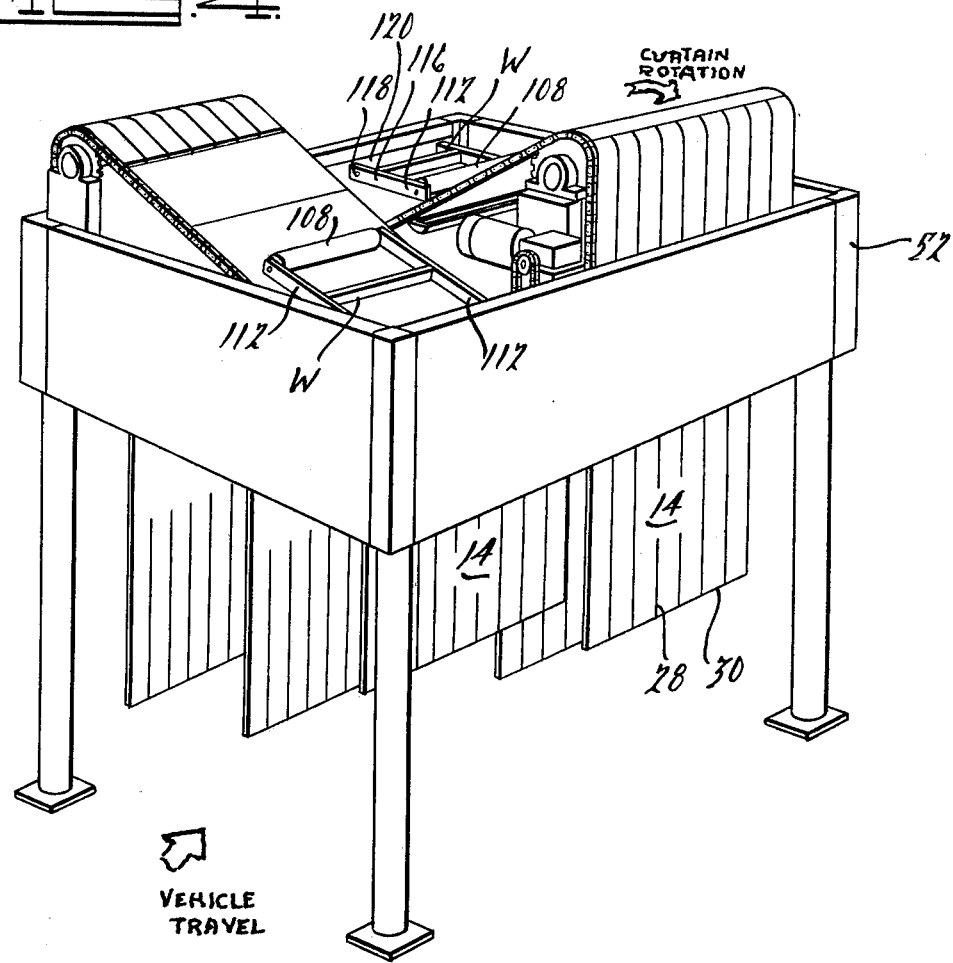
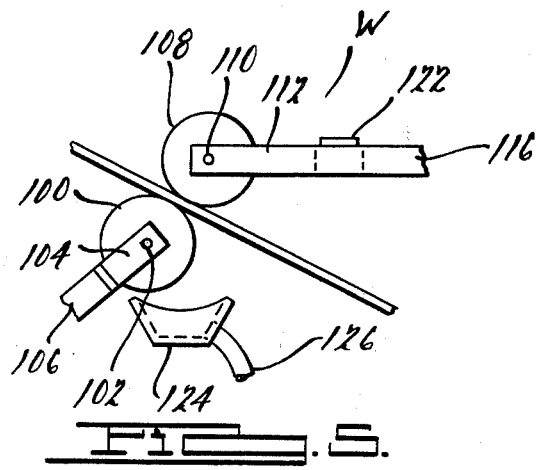
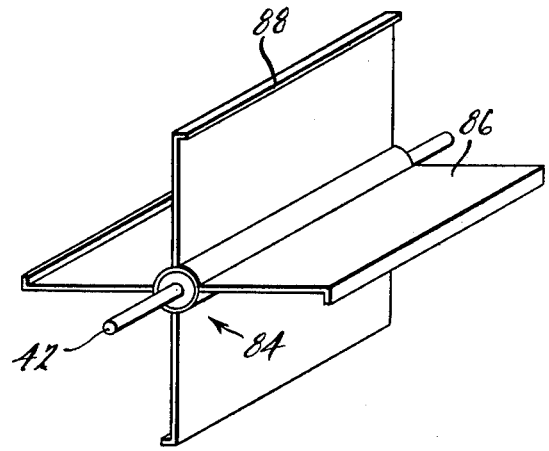

DRY WIPING SYSTEM FOR VEHICLES

BACKGROUND OF THE INVENTION

This invention relates generally to automatic car wash systems and more particularly to improved vehicle dry wiper arrangements of the endless conveyor curtain drier type for use in such systems.

Mechanical wiping arrangements have been proposed to substantially dispose with conventional air drying and hand wiping operations. Typically of these are the rotary dry wiping systems of U.S. Pat. No. 3,914,818 which comprise one or a pair of multi-arm rotor assemblies suspending wiping strips which, as the rotor turns about a vertical axis, pass over the vehicle surface. Such operations are large and cumbersome, are generally confined to use of narrow outboard strips limiting drying effectiveness and requiring substantial power for operation. Another system is that shown in U.S. Pat. No. 3,504,394 utilizing a combination of wiping and air drying and wherein an endless chain conveyor of two parallel chains is employed, the lower chain carrying suspended towels over the vehicle to effect drying and then upwardly where the towels are dried and then by the upper chain back to the starting point. When carried by the upper chain the adjacent towels because of their suspended length and spacing overlap and adhere to each other with substantial cohesiveness to produce a laminate effect. As a result the towels are still lying on the upper chain area when their top or supported portions reach the lower chain. Hence the towels do not hang free or become effective drying instruments until a substantial distance from the head end of the system. Valuable working space available for free hanging towels is thereby lost in the drying area of the system. It has also been suggested to utilize large drums as in U.S. Pat. Nos. 3,940,821 and 4,087,877 the latter equipped with pivoted plate assists to aid in unlaminating the towels. In both there is a reduction in the number of effective towels brought to the drying area by these massive and power consuming structures. Moreover in the latter patent the towel movement engendered by the pivotal plates is minimal and there results an uneven spacing of the towels encountering the wet vehicle surface.

SUMMARY OF THE INVENTION

The present invention has as its main object an improved vehicle drying apparatus of the endless conveyor type in which the number of drying curtains made effective in the drying process between the head and tail ends of the conveyor drying run in the space occupied by the apparatus is materially increased and an effective curtain drying operation is possible in a minimum of floor space.

More particularly it is an object of the invention to provide a curtain release and accelerating means to release the individual curtains substantially free of their laminate condition by a succession of lifting operations on each curtain and concurrently speeding up movement of the curtain free ends outwardly around the head end of the conveyor to enable the curtains to attain a free hanging condition before starting their movement into the vehicle drying area.

A specific object is to provide a curtain release and accelerating means in the form of a rotatable paddle wheel type of device which may be driven by the conveyor and which provides a plurality of angularly spaced radial paddle extensions spaced as to be synchronized with the spacing of the curtain carrying supports. A plurality of the paddles engage and lift each curtain from its laminate overlapping condition with adjacent curtains while speeding up its movement to exceed that of the carrier so that as the individual curtains approach the head end of the upper run of the conveyor the cohesion between successive curtains is broken and each curtain is quickly displaced and flipped over the head end of the conveyor upper run so as to enter the head end of the lower run of the conveyor free of looping with other curtains i.e. in a generally free hanging condition.

To further facilitate the release and free hanging of the drying curtains as they enter the head end of the lower run of the conveyor system it is another object of the invention to provide in the conveyor drive a vertical lateral run portion or section connecting the upper and lower runs which slopes obliquely inwardly and downwardly in connecting with the lower run and in the direction of movement thereof providing a vertical air column or space of sufficient depth into which the released curtains may be flipped and hang free before reaching the head end of the lower run. It also provides a location in which the curtains or their lower chamois sections may be easily replaced.

In providing a lateral run as in the previous object it is an object to provide an overall run of the endless drive that is of a generally triangular or modified parallelogram-like outline in which the upper run preferably slopes upwardly at an incline in connecting with the upper end of the lateral run and to provide in this inclined section means such as a wringer roll assembly for removing excess liquid or water from the curtains or absorbent portions thereof after they leave the lower horizontal run. A vacuum dewatering pipe structure over which the curtains may drag in leaving the lower run may also be provided at the tail end of the lower run below and adjacent the same.

A further specific object of the invention is to provide a drying system and apparatus as in the previous objects in the form of a single unit in which a plurality of the drying curtains one behind the other are abreast of the vehicle, are of greater width than the vehicle and when free extend immediately adjacent the floor and are moved in the longitudinal path of movement of the vehicle so as to dry the tops and sides as well as the ends of the vehicle.

It is also a particular object to provide in a unitary structure or apparatus which we have denominated as a "split dryer" comprising a pair of side by side units each as in the previous objects arranged transversely of the vehicle path such that their curtains which may be narrower may be dragged across the sides, top and end surfaces of the vehicle, the curtains of one unit moving in a direction opposite to that of the adjacent unit so that the vehicle surfaces are wiped a plurality of times and from opposite sides as the vehicle is moved past the units. A single vertical chain drive may drive both units.

The above and other objects, features and advantages attending the present invention will be understood from a consideration of the description of preferred embodiments of the invention following the accompanying drawings.

BRIEF DESCRIPTION OF THE DRAWING

Wherein

FIG. 2 is a side elevational view of the drying apparatus of the invention embodying features of FIG. 1 as applied to a single drying unit wherein the drying curtains move abreast of the vehicle along the path of the latter;

FIG. 4 is an elevational view in perspective showing the "split" or "double rotation" type of drying apparatus of the invention utilizing a pair of units such as shown in FIGS. 2 and 3 but of less width and wherein the drying curtains move across the vehicle i.e. transversely of the path of movement of the vehicle to be dried;

FIG. 5 is a fragmentary elevational view of a wringer mechanism shown in FIG. 4 for removing water from the curtains and located in FIG. 4 on the upper run of each unit; and FIG. 6 is a view in perspective of a paddle type accelerator which may be used in the apparatus of the invention of FIGS. 1, 2 and 4.

DESCRIPTION OF THE PREFERRED EMBODIMENTS

Figure 1:
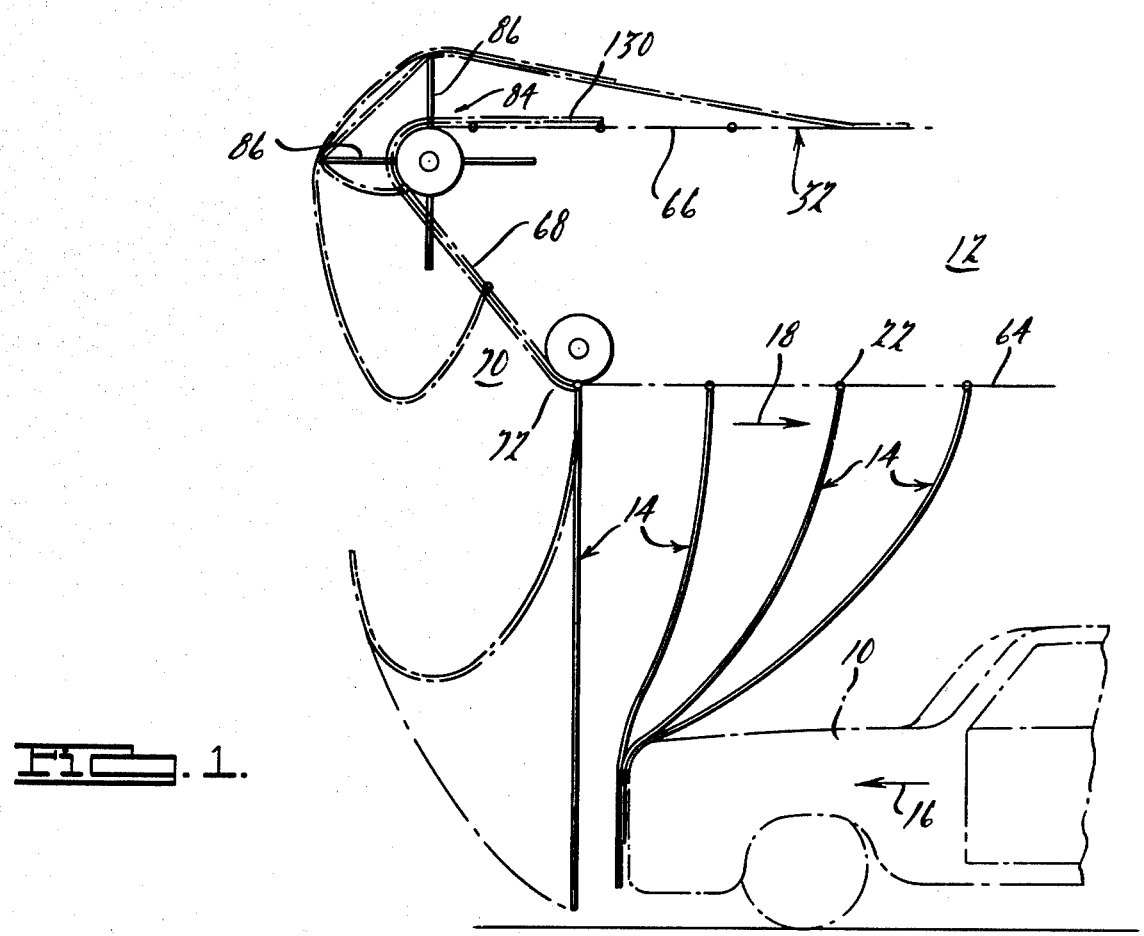
FIG. 1 is a schematic view illustrating certain apparatus and features of the invention.

Referring now to the drawings wherein like numerals indicate corresponding elements, FIGS. 1 and 2 show schematically a washed vehicle 10 passing through or about to enter a drying apparatus generally designated by the numeral 12. Drying curtains or wiping units 14 are arranged in the path of the vehicle which is moved in the direction of the arrow 16 while the curtains move in the direction of the arrow 18. Said drying curtains 14 are preferably made of an upper section 20 (FIG. 2) of hanging material carried by a rod 22 and a lower section 24 of water absorbing material such as synthetic chamois the two sections being releasably connected by suitable velco hook strips 26. The curtains 14 are considerably wider than the vehicle and all the lower sections 24 are divided by vertical cuts 28 (see FIG. 4) into a plurality of flaps or strips 30 (see FIG. 4) which accommodate themselves to the shape of the vehicle. Upon relative movement between the vehicle and curtains 14 the latter operate one after the other upon the vehicle being dragged over the front and hood then the windshield and top then the trunk and back, while side portions wipe the sides and fenders.

Movement of the curtains 14 is effected through the support pivot rods 22 which are carried between two endless conveyor chains generally designated by numeral 32 (See FIGS. 1, 2 and 3) arranged in vertical planes in the direction of movement 18. The transfer chains 32 are guided over chain sprocket wheels 34, 36, 38 respectively fixedly carried in shafts 40, 42, 44 respectively supported by suitable bearings 46, 48, 50 respectively carried by the frame 52. The shaft 44 is an idler shaft whose bearing 50 is a take-up bearing adjustable on the frame by screw 53 to take up slack in the chain. The transfer chains 32 are in turn driven by a driven sprocket wheel 54 carried by shaft 40 which wheel 54 connects by a chain drive 56 with a drive sprocket wheel 58 on a reduction gear 60 driven by an electric motor 62 carried by the frame 52.

It will be noted that while the chain drive 32 in FIG. 1 is of generally polygonal outline simulating a parallelogram, a triangular outline as in FIG. 2 is preferred. Both include a lower run 64, and upper run 66 and a lateral run 68. The latter slopes obliquely inwardly and downwardly in the direction of movement of the lower run 64 forming an acute angle with the vertical and forming a vertical space 70 adjacent the run 68 into which as hereinafter explained the released curtains 14 may drop and be capable of entering the head end 72 of the lower run 64 as at 73 in a freely hanging condition. Also the upper run slopes upwardly to ideally accommodate a wringer roll arrangement W shown in FIGS. 4 and 5 and hereinafter described, for removing water from the curtains 14. Vacuum may also be used for this purpose, FIG. 2 providing at 74 a vacuum pipe assembly clamped to the frame 52. A hose 76 connects the pipe 74 to a hollow frame leg 78 the upper end of which connects by a second hose 79 with a blower 80 source of vacuum. The leg 78 also serves as a collector chamber for water removed by vacuum pipe 74. Water conducted to the leg 78 by hose 76 is emptied therefrom through a drain valve 82. In removing water by vacuum the curtains 14 are dragged over the pipe 74 in moving from the lower run 64 to the upper run 66.

In order to assure effective use of the curtains 14 as their carriers 22 enter the head end 72 of the lower conveyor run 64 the invention provides, as best seen in FIGS. 2 and 6, an accelerator means in the form of a multi-bladed paddle wheel 84 whose equally spaced radial blades 86 are fixed on the conveyor driven shaft 42 at the discharge end 87 of the upper run 66. Each blade 86 is preferably formed at its outer end with a lip 88 which is turned in a direction opposite to the direction of rotation of wheel 84. Although four blades are shown it will be understood that a different number may be employed provided that they be synchronized with the spacing of the carriers 22 so as not to intercept the carriers during operation. Stated another way the wheel design and number of paddles is dictated by the number of teeth on the chain sprockets 36 and the spacing of the curtain hangers 22. If an odd number tooth sprocket is used with an even number of paddles or blades it is necessary to space the curtain hangers so that they enter and exit between the same pair of paddles each time dictating a curtain hanger spacing equal to or in full multiples of the full circumference of the pitch diameter of the sprocket. If an even number tooth sprocket is used in conjunction with an even number of paddles, then the hanger spacing can be of various multiples of portions of the circumference of the pitch diameter of the sprocket as long as the curtain hanger always enters and exits the openings between the paddles equally about a centerline between the two paddles. Moreover the ratio between the pitch diameter of the sprocket and the outside diameter of the paddle becomes a practical consideration for as the paddle wheel increases in diameter so must the sprocket size increase.

The blades 86 will be of sufficient number and radial length to conveniently and effectively break the laminate condition between adjacent curtains 14 on the upper run, lifting each succeeding curtain away from its adjacent curtain and by a plurality of blades supporting it away from the conveyor, and moving it at linear speed greater than that of the chain 32 around the discharge end 87 of the upper run and outwardly around that end so that each curtain will fall freely away from the conveyor and be in a freely hanging full vertical position or effective wiping position by the time its carrier 22 reaches the head end 72 of the lower run corresponding to the lowest point of travel at the bottom of the first of the two lower sprockets. In this operation the lateral space 70 between the inwardly sloping lateral run and the frame 52 facilitate the free fall of the curtains.

The described paddle arrangement and operation enables the provision of a maximum number of curtains hanging freely in a minimum amount of linear space along the path of the vehicle. This is a great advantage in car washers where space is of the utmost importance. Moreover the combination of the paddle wheel and inwardly spaced lower sprocket minimizes the size of the paddle wheel and the height spacing of the sprockets. Without this combination a similar result could only be obtained by increasing the distance between the upper and lower sprockets. Considering the fact that the curtains 14 hang from their supports 22 approximately 95 inches above the floor to give clearance for vans and that the curtains must be approximately 87 inches long to reach lower portions of vehicles the distance between sprockets vertically would have to be a minimum of 87 inches or a curtain length, in order to have it fall freely to a full vertical position before starting its horizontal path of travel. Such means a car wash bay would require an approximate minimum of 16 feet ceiling height to install such a unit. Most car washers only have 10 to 12 feet of head room especially if the dryer was positioned at the end of a car wash bay and beneath an overhead door. With the described embodiments of the invention a low ceiling installation is possible.

In operation of the embodiment in FIGS. 1 and 2 the vehicle 10 first intercepts the curtain 14 at the discharge end of the lower run 64 and successively moves through each of the succeeding curtains 14 which are wider than the vehicle and whose strips 30 enable them to wipe all surfaces of the vehicle. At the rearward end of the lower run and while still doing effective wiping the curtains move to the upper run to be released of their excess water by vacuum pipe 74 or preferably by the gravity wringer roll unit W following which the curtains 14 move up the slope on the upper run 66 with adjacent curtains overlapped or laminated to the head end of the upper run where the plurality of blades 86 of the rotating accelerator 84 serve to delaminate the adjacent curtains 14, lifting each of them outwardly and concurrently speeding up their linear movement such that each curtain is carried around the head end of the upper run and dropped to a free hanging position or upon a vehicle surface if the relative speeds of the conveyor and vehicle permit a second wipe of the same vehicle or if a new vehicle is passing through the unit. If there is no intervening vehicle surface the curtains will assume the free hanging position noted at 73 in FIG. 2 without entanglement with succeeding curtains a condition occurring where no accelerator is used and the end portion of the curtains would be still lying on the upper run as at 130 in FIG. 1 and become interlooped with the succeeding curtain and not becoming free hanging until well into the lower run 64.

Figure 3:
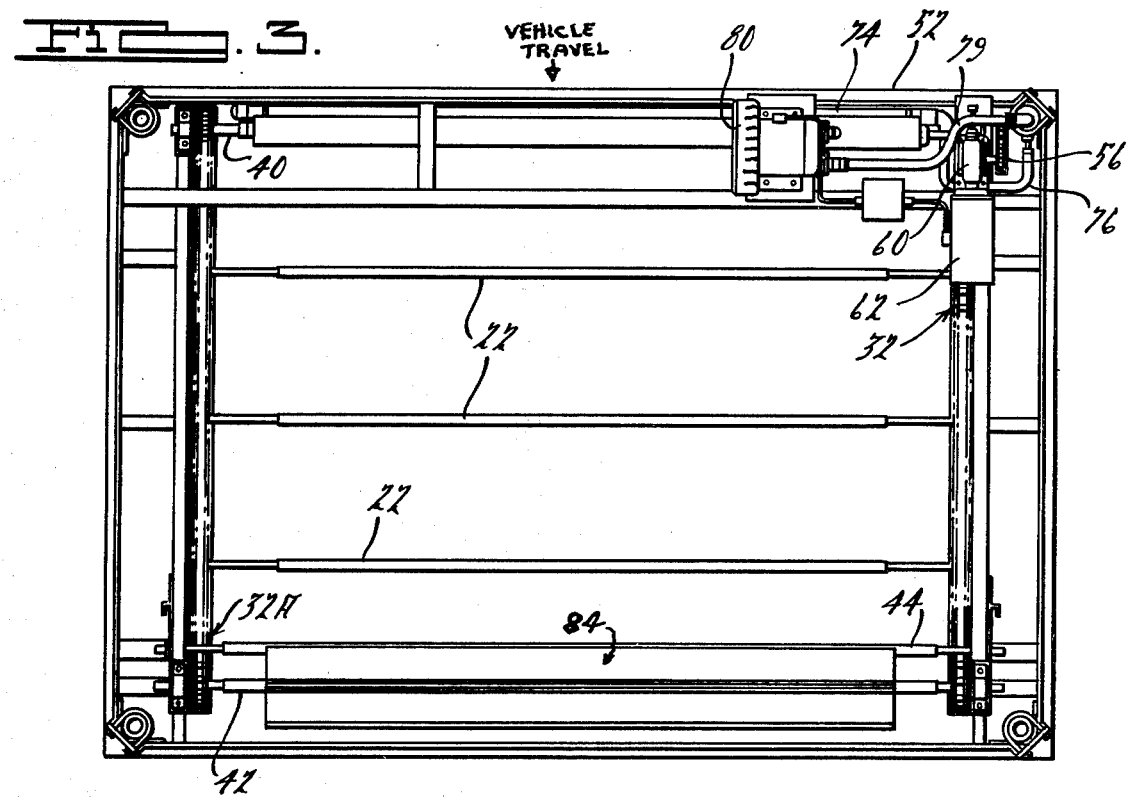
FIG. 3 is a top plan view of the apparatus of FIG. 2 with the drying curtains removed.

FIG. 4 is directed to an improved embodiment denominated as a "split curtain design" wherein two units such as shown in FIGS. 2, 3, and 6 and described above are arranged side by side in opposed relationship in a single frame structure and positioned to operate in a lateral path with respect to the direction of car travel, one half of the curtains 14 (the curtains of one unit) moving across the car from the driver's side and the other half (the curtains of the second unit) moving in the opposite direction from the passenger side. With this arrangement the curtains 14 need not be wider than the vehicle as in the FIGS. 2, 3 embodiment and the curtains move over and under, so to speak and are always directed with the face of each curtain squarely meeting the vehicle surface and substantially maintaining a straight path thereover and full wiping action producing an improved drying quality especially on the sides of the vehicle. Moreover the arrangement is particularly suited to fit into a minimum width wash bay and yet have the curtains always fall low enough to reach rocker panel areas of the vehicles being dried. This is so since in the FIG. 4 arrangement the curtain 14 shown at 73 in FIG. 2 at the start of the lower run of each conveyor cycle can be entirely clear of any vehicle side structure with respect to each vehicle passing through the unit whereas in FIG. 2 if there is a continuous run of vehicles the curtain 14 at 73 will have engaged the vehicle surface before reaching this location.

In the description of FIGS. 2 and 3 reference was made to use of a wringer assembly W for removing water from the curtains 14 instead of or to complement the vacuum device 74. This wringer assembly W as seen in FIGS. 4 and 5 is arranged adjacent the upper run 66 of the conveyor chains 32.

It comprises a fixedly positioned rotatable bottom roller 100 carried by a shaft 102 in opposite arms 104 (one shown) of a bracket 106 fixed to frame 52 in the space between the upper and lower runs 64, 66 of the conveyor chain 32 and an opposite rotatable top pressure roller 108 carried by a shaft 110 supported in opposite arms 112 of a swingable rigid yoke 116 hinged at 118 in a bearing bracket 120 attached to frame 52 which presses by gravity against the roller 100. Yoke 116 carries a slidably adjustable counterweight 122 adjustably secured by suitable means, such as clamp screws (not shown) along the arms 112. By shifting the counterweight 122 the pressure applied by roller 108 at the nip of rollers 100, 108 to the wet curtains may be increased or decreased. A suitable drain trough 124 is arranged below the roller 100 lengthwise thereof and supported by bracket 106 to collect water squeezed from the curtains. This trough may be connected by a hose 126 with a collection cavity provided by a hollow frame leg such as the leg 78 of FIG. 2 or other drain.

In operation of the FIG. 4 embodiment the curtains will move and be dewatered, and then manipulated by the accelerator 84, as described with respect to the FIG. 2 embodiment with this difference, among others, that the curtains 14 will be narrower and require less power to operate. Moreover each vehicle surface will be wiped from two directions and upon every cycle of the curtains each curtain will assume a free hanging position before making contact with the vehicle such making a more effective drying operation on the sides and rocker panels of the vehicle.

From the foregoing description of the invention it will be evident that a novel drying system and apparatus has been provided that achieves improved drying of the vehicle surfaces; that makes more effective handling and use of the drying curtains and that enables a dryer installation in automatic car wash operations where space is at a premium and ceiling heights are restrictive. It will be understood that various changes and modifications of the structures shown and described will occur to those skilled in the art without departing from the spirit and intent of the invention and all such changes, modifications and equivalent applications and structures are contemplated as coming within the purview of the following claims.

What is claimed is:

1. A vehicle drying apparatus comprising:
   (a) an endless conveyor having an upper run and a lower run,
   (b) a plurality of elongated liquid absorbing wiping units carried by said conveyor at spaced intervals there along and movable therewith, said lower run of said conveyor being positioned for bringing portions of said wiping units into wiping relationship with a vehicle surface below upon relative movement therebetween, and said spacing and length of said wiping units being such that successive wiping units overlap each other with a cohesive effect after leaving said lower run,
   (c) a rotatable accelerator member at the discharge end of said upper run of said conveyor for effecting lifting of each wiping unit free of its said lapping relationship and speeding up movement of the free ends of the wiping units outwardly around said discharge end of the upper run of the conveyor to facilitate free hanging of said wiping units, and
   (d) means for removing liquid from said wiping units after wiping said vehicle surface and prior to leaving said upper conveyor run.

2. A vehicle drying apparatus as claimed in claim 1 wherein said conveyor is a chain conveyor and wherein said accelerator member comprises a multi-bladed wheel rotatable in synchronism with said chain conveyor.

3. A vehicle drying apparatus comprising:
   (a) an endless conveyor, said conveyor having an upper run, a generally horizontal lower run and a lateral run connecting the head end of said lower run, with the discharge end of said upper run,
   (b) a plurality of elongated water absorbing wiping units carried by said conveyor at spaced intervals there along and movable therewith, said lower run of said conveyor being positioned for bringing portions of said wiping units into wiping relationship with a vehicle surface below said lower run upon relative movement therebetween, and said spacing and length of said wiping units being such that successive wiping units overlap each other with capillary adhesion after leaving said lower run,
   (c) rotatable accelerator means at the discharge end of said upper run of said conveyor for effecting lifting of each wiping unit free of its said lapping relationship and speeding up movement of the free ends of the wiping units outwardly around said discharge end of the upper run of the conveyor to facilitate free hanging of said wiping units, and
   (d) means for removing water from said wiping units after wiping said vehicle surface and prior to leaving said upper run.

4. A vehicle drying apparatus as claimed in claim 3 wherein said accelerator means comprises a multi-bladed wheel, said wheel having a plurality of its blades engageable with each successive wiping unit whereby to lift each unit free of its lapping relationship by a succession of lifting operations.

5. A vehicle drying apparatus as claimed in claim 3 wherein said lateral run slopes downwardly at an acute angle to the vertical in the direction of travel of said lower run.

6. A vehicle drying apparatus as claimed in claim 3 wherein said upper run slopes upwardly at an acute angle to the horizontal in connecting the lower run with said lateral run and said lateral run slopes downwardly at an acute angle to the vertical in the direction of travel of said lower run in connecting said upper run with said lower run.

7. A vehicle drying apparatus as claimed in claim 3 wherein said upper run has associated with it a wringer roll system for squeezing water from the wiping units carried by said upper run, said system comprising a lower rotatable roller fixedly positioned adjacent the under side of said wiping units, an upper rotatable roller urged by gravity into pressure engagement with said lower roller through the wiping units, a swingable support rotatably carrying said upper roller and a counter weight adjustable on said support for adjusting the pressure applied by said upper roller against said lower roller.

8. A vehicle drying apparatus as claimed in claim 3 wherein said wiping units have a width greater than the width of the vehicle and wherein the lower portions of the units are divided by vertical cuts into a plurality of strips accommodating the units to the top and side surfaces of the vehicle.

9. A vehicle drying apparatus as claimed in claim 3 including a leg supported frame structure for supporting said apparatus and wherein said water removing means of said apparatus comprises a tubular member carried by said frame structure and arranged to be contacted by said wiping units as they pass from said lower run to said upper run, a plurality of apertures in said tubular member through which vacuum may be applied to said wiping units, a vacuum source connected with said tubular member, a water collection chamber in a supporting leg of said frame structure and means connecting said tubular member and said chamber.

10. A vehicle drying apparatus comprising:
   (a) a pair of endless conveyors arranged side by side in opposed relationship in a unitary frame structure, each said conveyor having an upper run and a lower run,
   (b) a plurality of elongated liquid absorbing wiping units carried by each said conveyor at spaced intervals there along and movable therewith in a lateral path with respect to the direction of vehicle travel, the wiping units of one of said conveyors being arranged to move across the vehicle from the driver's side and the wiping units of the other of said pair of conveyors being arranged to move in the opposite direction from the passenger side, said lower runs of said conveyors being positioned for bringing portions of said wiping units into wiping relationship with a vehicle surface below upon relative movement therebetween, and said spacing and length of said wiping units being such that successive wiping units of each said conveyors overlap each other with a cohesive effect after leaving the said lower run of each conveyor,
   (c) a rotatable accelerator member positioned at the discharge end of the upper run of each conveyor for effecting lifting of each wiping unit free of its lapping relationship and speeding up movement of the free end of the wiping unit outwardly around the discharge end of its conveyor to facilitate free hanging of said wiping units, and (d) means for removing liquid from said wiping units after wiping said vehicle surface and prior to leaving said upper conveyor runs.

11. A vehicle drying apparatus as claimed in claim 10 wherein the width of the wiping units is less than 25 percent of the overall length of the lower run of the endless conveyor.

12. A vehicle drying apparatus as claimed in claim 10 wherein the means for removing liquid from said wiping units is a wringer roll system associated with said upper run for squeezing liquid from the wiping units carried by said upper run, said system comprising a lower rotatable roller fixedly positioned adjacent the under side of said wiping units, an upper rotatable roller urged by gravity into pressure engagement with said lower roller through the wiping units, a swingable support rotatably carrying said upper roller and a counterweight adjustable on said support for adjusting the pressure applied by said upper roller against said lower roller.

13. A vehicle drying apparatus as claimed in claim 10 wherein each said accelerator member is a multi-bladed wheel rotatable in synchronism with the conveyor.

* * * * *